United States Patent
Aoyama et al.

(10) Patent No.: US 6,874,655 B2
(45) Date of Patent: Apr. 5, 2005

(54) METHOD AND DEVICE FOR AUTOMATICALLY FEEDING PARTS HAVING THROUGH-HOLE

(75) Inventors: Yoshitaka Aoyama, 20-11 Makitsukadai 2-cho, Sakai-shi, Oasaka-fu (JP); Shoji Aoyama, Sakai (JP)

(73) Assignee: Yoshitaka Aoyama, Osaka-fu (JP)

( * ) Notice: Subject to any disclaimer, the term of this patent is extended or adjusted under 35 U.S.C. 154(b) by 263 days.

(21) Appl. No.: 10/111,892

(22) PCT Filed: Aug. 23, 2001

(86) PCT No.: PCT/JP01/07233

§ 371 (c)(1),
(2), (4) Date: Jul. 22, 2002

(87) PCT Pub. No.: WO02/20209

PCT Pub. Date: Mar. 14, 2002

(65) Prior Publication Data
US 2003/0039532 A1 Feb. 27, 2003

(30) Foreign Application Priority Data

Sep. 9, 2000 (JP) .................................... 2000-315854
Dec. 25, 2000 (JP) .................................... 2000-404630

(51) Int. Cl.$^7$ ........................................... A01C 9/00
(52) U.S. Cl. ................................. 221/213; 219/86.25
(58) Field of Search ............................... 221/195, 212, 221/213; 219/93, 86.25

(56) References Cited

U.S. PATENT DOCUMENTS

| 2,763,173 A | * | 9/1956 | Bailey et al. | ............... 81/57.37 |
| 2,953,049 A | * | 9/1960 | Vilmerding | ................ 81/57.37 |
| 4,020,316 A | * | 4/1977 | Schaft et al. | ................ 219/103 |
| 5,007,795 A | * | 4/1991 | Yoshimura | ................... 414/737 |
| 5,067,763 A | * | 11/1991 | Aoyama | ..................... 294/65.5 |
| 5,191,691 A | * | 3/1993 | Aoyama | ..................... 29/281.4 |
| 5,230,141 A | * | 7/1993 | Aoyama | ....................... 29/719 |
| 5,359,171 A | * | 10/1994 | Aoyama | ....................... 219/93 |

* cited by examiner

Primary Examiner—Richard Ridley
(74) Attorney, Agent, or Firm—J.C. Patents (57) ABSTRACT

A method of automatically feeding a part (4) having a through-hole to an intended place comprises the steps: disposing a feed rod (6) capable of advancing toward an intended place to which the part (4) is to be fed, said feed rod (6) consisting of a slide rod (16) of larger diameter and a guide rod (17) of smaller diameter, said guide rod (17) retractably projecting beyond the front end of the slide rod (16); provisionally holding the part (4) in a predetermined position on the advance/retraction axis of the feed rod (6); advancing the feed rod (6) to cause the guide rod (17) to pierce through the though-hole (10) in the part (4) so as to feed the part (4) to said intended place; and detecting, when relative displacement of the guide rod (17) with respect to the slide rod (16) occurs during the advance of the feed rod (6), such relative displacement and issuing a signal.

14 Claims, 8 Drawing Sheets

METHOD AND DEVICE FOR AUTOMATICALLY FEEDING PARTS HAVING THROUGH-HOLE

BACKGROUND ART

This invention relates to a method and device for automatically feeding parts having a through-hole to an intended place, and may, for example, be used for feeding projection nuts onto the electrode of a welding machine.

It is known to cause a projection nut being fed in from a parts feeder or the like to abut against a stop surface to be stopped at a predetermined position, and then to advance a feed rod until a guide rod for the feed rod pierces through the threaded hole of the projection nut so as to feed it to an intended place. Such intended place is generally a guide pin for a fixed electrode, which guide pin projects through a positioning through-hole in a steel sheet part set on the fixed electrode. To there is fed the projection nut, whereupon a movable electrode is advanced to weld the projection nut to the steel sheet part.

There is a problem that if misalignment, even very little, is involved in setting the feed rod, the latter can abut against the guide pin for the electrode and be bent. What is considered to be most important is the problem of safety for the operator. If the operator's hand is accidentally nipped between the guide rod and the guide pin, the welding electrode should in no case be allowed to advance. The reason is that if the hand should be nipped in the welding electrode, it will be seriously injured.

The present invention is intended to solve the problems described above.

DISCLOSURE OF THE INVENTION

According to an embodiment of the invention, a method of automatically feeding parts having a through-hole comprises the following steps:

disposing a feed rod capable of advancing toward an intended place to which the part is to be fed, said feed rod consisting of a slide rod of larger diameter and a guide rod of smaller diameter, said guide rod retractably projecting beyond the front end of the slide rod;

provisionally holding the part in a predetermined position on the advance/retraction axis of the feed rod;

advancing the feed rod to cause the guide rod of the feed rod to pierce through the though-hole in the part so as to feed the part to said intended place; and detecting, when relative displacement of the guide rod with respect to the slide rod occurs during the advance of the feed rod, such relative displacement and issuing a signal. When the operator's hand is accidentally nipped between the guide rod and the intended place as the feed rod is advanced, the guide rod will be relatively retracted into the slide rod. Therefore, the nipping force on the hand is too small to cause any injury. Simultaneously, it is possible to issue an alarm or stop the operation of the device by means of a signal obtained from said relative displacement.

Examples of parts having a through hole include projection nuts. In the case where said intended place is located between a pair of coaxially opposed welding electrodes, the advance of the welding electrode can be stopped in response to a signal from a safety means. If the operator's hand is accidentally nipped between the guide rod and the electrode (electrode guide pin) when the feed rod is advanced to electrode, the guide rod will be relatively retracted into the slide rod. Therefore, the nipping force on the hand is too small to cause any injury. Simultaneously, stopping the operation of the welding electrode by a signal obtained from said relative displacement prevents the movable electrode from advancing, so that the worst situation in which the operator's hand is nipped between the movable and fixed electrodes is avoided. When the front end of the guide rod bumps against the electrode guide pin, the bending of the guide rod or damage to the electrode guide pin is prevented by the same operation as when the hand is nipped.

According to another embodiment of the invention, a device for automatically feeding parts having a through hole comprises the following components:

a feed rod capable of advancing toward an intended place to which a part is to be fed, said feed rod consisting of a slide rod of larger diameter and a guide rod of smaller diameter, said guide rod retractably projecting beyond the front end of the slide rod;

provisional holding means for provisionally holding the part in a predetermined position on an advance/retraction axis of the feed rod;

drive means for advancing the feed rod to cause the guide rod of the feed rod to pierce through the through-hole in the part so as to feed the part to said intended place; and detecting means for detecting, when relative displacement of the guide rod with respect to the slide rod occurs during the advance of the feed rod, such relative displacement and issuing a signal.

As in the case of said automatic feeding method, example of parts having a through hole include projection nuts. And, in the case where said intended place to which a part is to be fed is located between a pair of coaxially opposed welding electrodes, the advance of the welding electrode can be stopped in response to a signal from a safety means. The protective function to provide against situations in which the operator's hand is nipped is as already described in connection with the automatic feeding method described above. Further, when said relative displacement is produced, a signal is issued from a means for detecting such displacement. With this signal serving as a trigger, the advance of the movable electrode is stopped, avoiding the hand being nipped between the electrodes.

An air cylinder is generally used as a driving means for advancing and retracting the feed rod, but as an alternative means, a servomotor may be used. In that case, a mechanism may be used which converts the rotary motion of the main shaft of the servomotor into the axial motion of the feed rod through a ball screw. Further, providing a position detecting means, such as an encoder for detecting the rotary angle of the main shaft of the servomotor makes it possible to accurately control the advance/retraction stroke, and hence the advance position, of the feed rod on the basis of a signal from the position detecting means. Further, employing an electric motor in place of the air cylinder improves the operating environment in terms of noise and sanitation and besides this, makes it possible to avoid driving by means of along-sized part, such as an air cylinder, so that the entire device can be made compact.

The detecting means for detecting the presence or absence of relative displacement of the guide rod may take the form of a first sensor, attached to a stationary member, which detects relative displacement of said guide rod with respect to said rod and issues a signal.

When the front end of the guide rod bumps against the electrode guide pin and the operators hand is nipped as described above, the guide rod will perform relative displacement with respect to the slide rod. This displacement is detected by the detecting means installed on the stationary member, with the result that the electrode action can be stopped in response to a signal issued by the detecting means. Attaching the detecting means to the stationary member ensures that relative displacement of the guide rod is reliably detected to achieve highly reliable control of the electrode action.

A second sensor which detects the return stroke of the feed rod and emits a signal may be installed so as to permit advance of the welding electrode on the condition of the presence of signals from the first and second sensors. The advance/retraction stroke of the feed rod is always of predetermined advance/retraction length even when the guide rod bumps against the electrode guide pin or operator's hand. When compatibility of a detection signal obtained from this stroke state with a detection signal showing absence of relative displacement of the guide rod is established, advance of the welding electrode is effected. That is, by confirming that the guide rod is in its normal position with respect to the predetermined stroke cycle of the feed rod, an instruction for actuation of the electrode is issued. In other words, the feed rod stroke signal and the normal guide rod signal are related to each other under AND-condition to cause the operation to shift to welding electrode actuation. That the guide rod is normal as mentioned above means that the welding electrode is advanced after operator's safety and non-abutment of the guide rod against the electrode guide pin have been confirmed; thus, a device which is superior in terms of safety and in device damage prevention is realized.

The concept "detection of relative displacement of the guide rod," as is clear from embodiments to be later described, is to be understood to mean that in the case where there is something abnormal occurring in the guide rod, presence of relative displacement is detected and that in the case where the guide rod is normal, absence of relative displacement is detected.

There are provided (1) a guide section which has a guide tube receiving the feed rod for advance and retraction movement and a parts feed tube joined to the front end of the guide tube, with a groove formed in the end surface of the guide tube, said groove guiding a part being fed from said parts feed tube, and (2) a provisional stop chamber.

The invention of claim 1 relates to an arrangement wherein comprising a provisional stop chamber for projections nuts formed at the intersection between a parts feed tube and a guide tube, a feed rod adapted to advance and retract in the guide tube, said feed rod comprising a guide rod adapted to advance into a threaded hole in a projection nut, a slide rod of larger diameter than said guide rod and a push-out surface formed in the boundary between the guide rod and the slide rod, characterized in that the wall-thickness of the guide tube is large and that a guide section and a provisional stop chamber, which serve for projection nuts, are formed by a groove formed in the end surface of the guide tube. The provision of the guide section and the provisional stop chamber for projection nuts in the end surface of the guide tube ensures that the nut is smoothly transferred from the guide section to the provisional stop chamber and smoothly temporarily locked. Formation of the groove in the end surface of the guide tube makes it possible to accurately set a space required for the provisional stop chamber. And, formation of the groove directly in the guide tube ensures accurate axial alignment between the feed rod in the guide tube and the threaded hole in the nut in the provisional stop chamber, so that the guide rod reliably enters the threaded hole, performing the role of nut feeding without malfunction. Since it is only necessary to form the groove to pass through the axis of the guide tube, the manufacture is simple and accuracy is easily obtained.

A guide plate which forms the inner wall of the provisional stop chamber in the end of said groove is installed and a magnet is attached to said guide plate. Therefore, the guide plate is attached to the provisional stop chamber which is formed with a high degree of accuracy, so that temporary locking position of the projection nut can be accurately set. Simultaneously, since the guide plate can be constructed so that it intimately contacts with the guide tube alone, increased accuracy in attaching the guide plate can be easily realized.

The guide tube is made of nonmagnetic material. Making the guide tube of nonmagnetic material eliminates the possibility of inner surface of the guide section or provisional stop chamber being magnetized by the magnet of the guide plate. Therefore, the projection nut passing there is never subjected to attraction and is smoothly transferred.

The slide rod of the feed rod is of square cross section and is slidably received in the guide groove of square cross section formed in the guide tube. Since the slide rod of square cross section is guided in the guide groove serving for tight-fitting therefore, the direction of rotation of the feed rod can be accurately maintained at all times. Particularly, since the push-out surface is square, intimate contact holding of the nut is reliably attained during the nut push-out with the push-out surface in intimate contact with the square projection nut and the direction of rotation of the nut is correctly maintained. That is, the nut is pushed out such that the square nut end surface accurately coincides with the square push-out surface.

Because of the slide rod of such square cross section, some rotation stop member or other is installed, the direction of rotation of the feed rod can be always accurately maintained using a simple structure. For example, by forming a guide groove which snugly contacts the slide rod, smooth slide and reliable turn stoppage are attained. Furthermore, since the square projection nut is intimately contacted without the push-out surface shifting in the direction of rotation, the area of contact between the push-out surface and the nut end surface can be set at a maximum value. This means that the nut will not rotate without reason during advance of the feed rod; therefore, the nut is fed in a predetermined direction to the intended place. In other words, when the nut is pushed out while the push-out surface, which is square, is making intimate contact with the square projection nut, the faster advancing speed of the feed rod than the falling speed of the nut ensures intimate contact holding of the nut is reliably effected and the direction of rotation of the nut is correctly maintained. That is, the nut is pushed out while the square nut end surface accurately coincides with the square push-out surface.

The invention will now be described in detail with reference to the accompanying drawings.

BEST MODE FOR CARRYING OUT THE INVENTION

Figure 1:
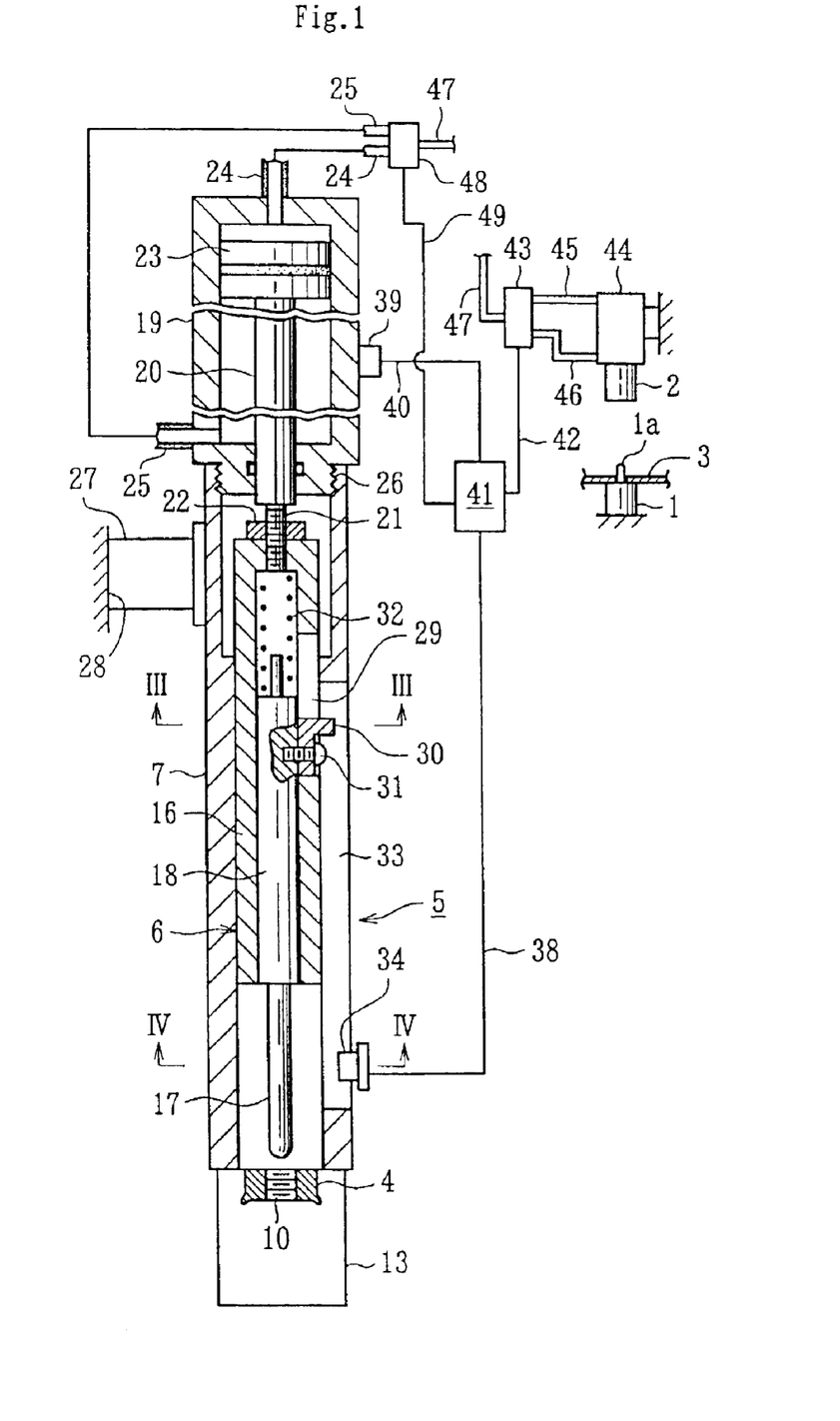
FIG. 1 is a longitudinal section showing an embodiment of the invention.
Figures 2, 3:
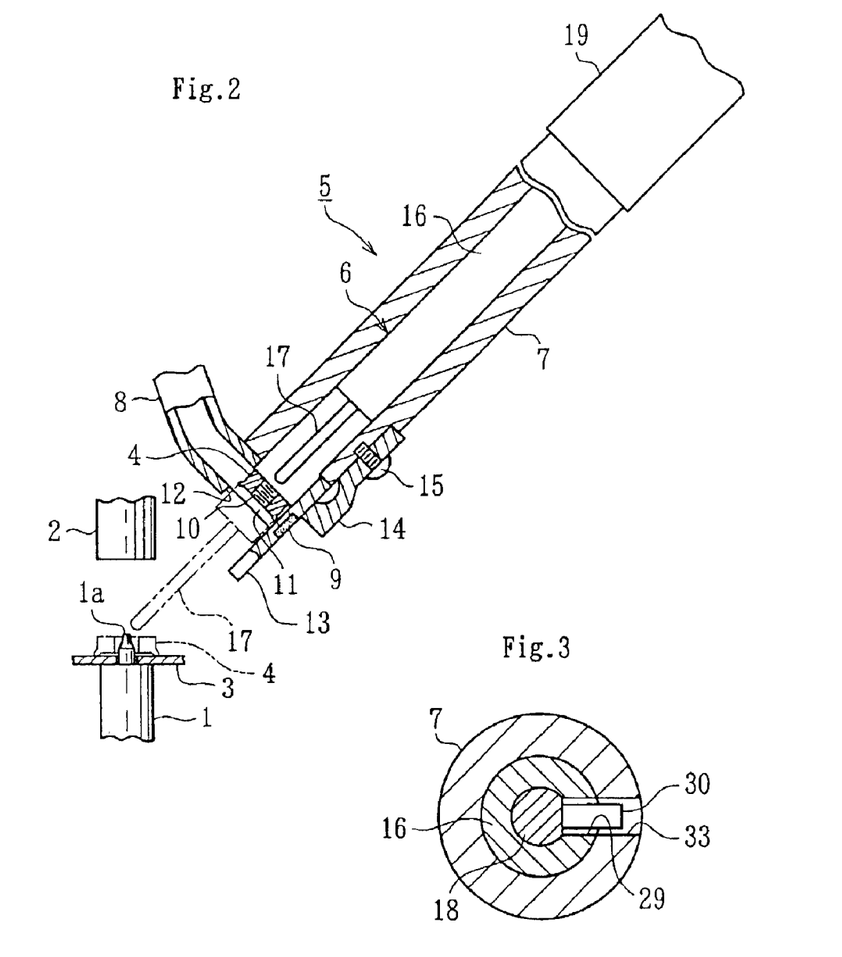
FIG. 2 is a schematic elevation, partly in section, of a device in its entirety.
FIG. 3 is a III—III section of FIG. 1.

FIG. 1 is a longitudinal section of an operating unit 5 shown in FIG. 2, also showing a control circuit and an air passageway. FIG. 2 is an elevation, partly in section, showing the entire construction. A fixed electrode 1 and a movable electrode 2 are coaxially disposed, said fixed electrode 1 having placed thereon a steel sheet part 3, on which is placed a projection nut 4, to which electric resistance welding is applied by the movable electrode 2 moving close thereto. An operating unit for a feed rod is denoted collectively by the reference numeral 5. The operating unit 5 comprises a feed rod 6, a guide tube 7 for guiding the same, and a nut feed tube 8 and a magnet 9 which are connected to a parts feeder (not shown). The reference character 1a denotes a guide pin retractably projecting from the fixed electrode 1.

The projection nut 4 is a general one with a square shape, having a threaded hole 10 extending through the central portion thereof, with projections for welding purposes at four corners. Because of the nut 4 having such a shape, the nut feed tube 8 has a rectangular cross-section. The nut feed tube 8 is welded to the lower end of the guide tube 7, and a provisional stop chamber 11 is formed at the intersection of the feed tube 8 and guide tube 7, the lower side of said chamber serving as an outlet opening 12. A guide plate 13 is fixed to the guide tube 7 in such a way as to close the end of the provisional stop chamber 11, and a magnet 9 is embedded in part of the guide plate 13. Denoted by the reference numeral 14 is a presser member for fixing the guide plate 13, said presser member being firmly attached to the guide tube 7 by a bolt 15. When the nut 4 traveling in the nut feed tube 8 reaches the provisional stop chamber 11, it is temporarily locked (provisional held) in that it is attracted by the magnet 9.

The feed rod 6 comprises a slide rod 16 of larger diameter and a guide rod 17 of smaller diameter, the guide rod 17 being combined with the slide rod 16 such that it can be advanced and retracted relative to the slide rod 16. The slide rod 16 is of hollow tubular construction, and the guide rod 17 is fitted therein for advancing and retracting movement. The guide rod 17 is formed with a slide portion 18 having a somewhat larger diameter, said portion being adapted to slide along the inner surface of the slide rod 16 (see FIGS. 3 and 4). The feed rod 6, which, in this case, is advanced and retracted by an air cylinder 19, is coaxially joined to the piston rod 20 thereof. The end of the piston rod 20 is formed with a bolt portion 21, which is screwed into the end of the slide rod 16 and clamped down by a lock nut 22. The reference numeral 23 denotes a piston, and 24 and 25 denote air hoses. Further, the air cylinder 19 and guide tube 7 are integrated by a threaded portion 26, and the guide tube 7 is fixed to a stationary member 28 through a bracket 27.

The feed rod 6 is slidably inserted in the guide tube 7. Part of the slide rod 16 is formed with an axially extending elongated opening 29, through which passes an iron projection 30 fixed on the slide portion 18. The projection 30 is an L-shaped member, fixed to the slide portion 18 by a bolt 31. A compression coil spring 32 inserted in the slide rod 16 imposes an elastic force on the guide rod 17 in the push-out direction, so that the overall length of the feed rod 6 is set by the projection 30 abutting against the lower end of the elongated opening 29.

Figure 4:
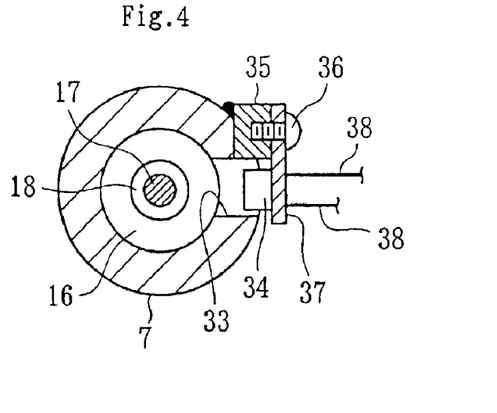
FIG. 4 is a IV—IV section of FIG. 1.

The guide tube 7 also is formed with an axial elongated opening 33, in which part of the projection 30 is inserted. A proximity switch type sensor 34 is attached to the lower region of the elongated opening 33. This sensor 34 is positioned such that it will coincide with the projection 30 when there is no relative displacement of the guide rod 17 with respect to the slide rod 16 as the feed rod 6 advances by an amount corresponding to a predetermined stroke. That is, this is the state shown in solid lines in FIG. 5. The sensor 34 is attached to a stationary member, and as shown in FIG. 4, a support plate 37 is attached by a bolt 36 to a block 35 welded to the guide tube 7, with a sensor 34 attached to said support plate 37. The reference numeral 38 denotes lines for taking out electric signals from the sensor 34.

Figure 5:
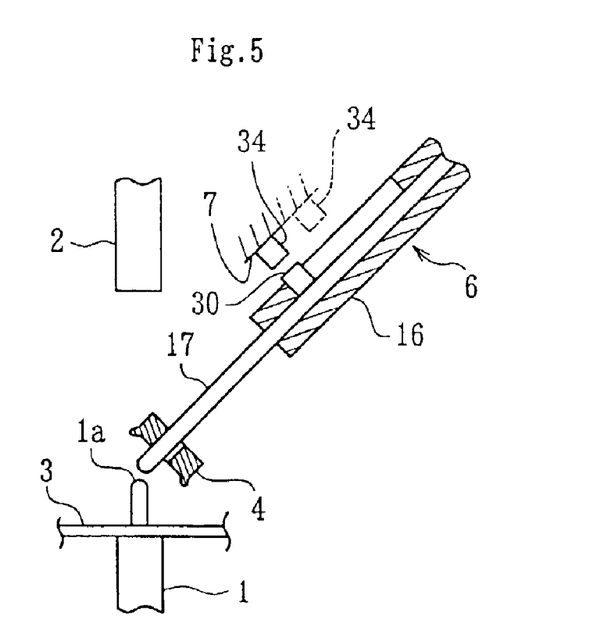
FIG. 5 is a longitudinal section showing a feed rod in normal time.
Figure 6:
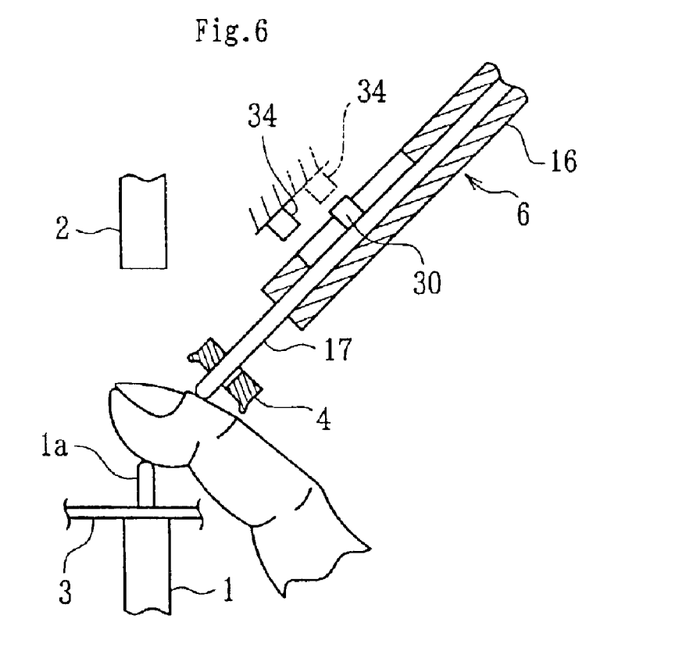
FIG. 6 is a longitudinal section showing the feed rod in abnormal time.

The sensor 34 is a "means for detecting relative displacement" when the guide rod 17 is displaced relative to the slide rod 16 as the feed rod 6 advances. It detects the state in which the projection 30 does not coincide with the sensor 34 as shown in FIG. 6. and makes a decision that "there is relative displacement." Thus, it makes a decision that "there is relative displacement" in that no signal comes out of the sensor 34 even a given period of time after the feed rod 6 has advanced by an amount corresponding to a predetermined stroke. A control circuit that performs such function can be easily embodied by a combination of ordinary timers and switches. Therefore, in the illustrated embodiment, the signal indicating that "there is no relative displacement" is obtained from the state in which the projection 30 coincides with the sensor 34, as shown in FIG. 5.

As for "means for detecting relative displacement," other various types may also be employed. For example, they include a construction for passing an electric current in response to relative displacement, a construction for moving the operating element of a limit switch by means of relative displacement, and a construction for detecting relative displacement by a photoelectric sensor. Further, as shown in two-dot chain lines in FIGS. 5 and 6, it may be arranged that when the guide rod 17 is relatively displaced, the projection 30 coincides with the sensor 34. In addition, the finger of FIG. 6 is exaggerated for better understanding.

A sensor for detecting the stroke state of the feed rod 6 is denoted by the reference numeral 39. This sensor 39 is of a proximity switch type, fixed on the outer peripheral portion of the air cylinder 19 and located in the vicinity of the center of the all stroke of the piston 23. Instead of attaching the illustrated sensor 39 to the air cylinder 19, it may be attached to the outer peripheral portion of the guide tube 7 at a position corresponding to the vicinity of the center of the all stroke of the piston, so that a signal is emitted when the upper end of the feed rod 6 passes by the sensor section.

The line 38 from the sensor 34 and the line 40 from the sensor 39 are connected to a controller 41. Further, an air selector valve 48 for advancing and retracting the air cylinder 19 is installed, with its line 49 connected to the controller 41. When the controller 41 makes a decision that since no relative displacement has occurred to the guide rod 17, the electrode should be allowed to advance, an operating signal is sent from an instruction line 42 to the air selector control valve 43, causing the movable electrode 2 to advance.

If the front end of the guide rod 17 bumps against the operator's hand, the guide rod 17 is retracted into the slide rod 16 against the spring force of the compression coil spring 32. Therefore, no excessive force acts on the operator's hand, resulting in no serious injury.

And, since the sensor 34 emits no signal, the controller 41 makes the decision of "abnormality" so that the instruction line 42 sends a signal to the air selector control valve 43 to stop advancing the movable electrode 2, so that the hand being nipped in the electrode is avoided. The reference numeral 44 denotes an operating air cylinder for the movable electrode; 45 and 46 denote air supply and exhaust hoses leading to the air cylinder 44; and 47 denotes a hose from an air supply source.

In order to realize "stoppage of advance of the welding electrode upon detection of relative movement of the guide rod with respect to the slide rod," the operations of the various parts of the device are effected in a predetermined operation sequence. Various types of this operating sequence may be employed. An example of operation sequence formed by using illustrated sensors, air selector control valve and controller is as follows.

The turning on/off of a starting signal, though not shown, is effected by a foot switch operable by the foot. When this starting signal is off, the air selector valve 48 for the air cylinder 19 is off, with compressed air being fed to the lower side of the piston 23 through the air hose 25, the feed rod 6 being maintained in its retracted position. In this state, the sensors 34 and 39 are off.

When the starting signal is turned on, first, the off-state of the sensor 34 is stored in the controller 41. Simultaneously therewith, the air selector valve 48 is turned on, feeding compressed air to the upper side of the piston 23 to advance the feed rod 6. Then, if the guide rod 17 does not bump against the operator's hand, the projection 30 coincides with the sensor 34 (see FIG. 5) and an on-signal from the sensor 34 is fed to the controller 41 through the line 38. The changes of the air selector valve 48 to on-position and of the sensor 34 from off-position to on-position are stored in the controller 41. When the feed rod 6 advances and completes nut feeding, a timer, not shown, is started, and after the lapse of a predetermined period of time, the air selector valve 48 is switched to cause the feed rod 6 to start its return stroke. In the course of this return, the sensor 39 emits a signal. This signal and a signal indicating that the control valve 48 is on and that the sensor 34 is on are AND-processed by the controller 41, whereby the controller 41 sends an operating signal to the air selector control valve 43 through the instruction line 42; thus, the movable electrode 2 is advanced.

In the advance stroke of the piston 23 also, the piston 23 passes by the sensor 39, but it is arranged that the signal this time is not picked up or that such signal is combined with the timer in such a manner that the sensor 39 emits no signal. The operation sequence described so far refers to the normal case where the guide rod 17 does not bump against the finger or the like.

The operating sequence for the abnormal case where the finger or the like is nipped will now be described. Even though the feed rod 6 advances in the sequence described above with the stating signal turned on, the front end of the guide pin 17 is moving relative to the slide rod 16, so that the projection 30 never coincides with the sensor 34, therefore, the sensor 34, which is now off, emits no signal. Thus, "change of the sensor 34 from off to on" cannot be secured as a signal, so that even if a signal is emitted from the sensor 39 during the return stroke of the feed rod 6, the AND-processing in the controller 41 as described above fails. Finally, no starting signal is emitted from the instruction line 42 to the air selector control valve 43 and the movable electrode 2 does not advance. In this manner, the worst situation of the operator's hand being nipped in the electrode is avoided.

In addition, if the sensor 34 goes out of order for some reason or other, sending an on-signal at all times, then even if the finger is nipped in the guide rod 17, said conditions for advance of the electrode are met; this is insufficient to serve as a safety measure. Thus, it is a wise policy to send a check signal to the sensor 34 in advance to preliminarily check whether there is a malfunction.

By changing the installed state of the sensors in FIG. 1, it is possible, finally, to avoid "the finger being nipped in the electrode." For example, this is attained by installing sensors in the retracted and advanced positions of the air cylinder 19, respectively, and causing the controller 41 to store the on-signal in the advanced position and the on-signal from the sensor 34 to indicate that the finger is not nipped in the guide rod 17, wherein the stored state and the signal in the retracted position obtained when the air cylinder 19 is returned are AND-processed as described above, and an instruction to advance the electrode is issued.

If the finger is nipped in the guide rod 17, an on-signal from the sensor 34 is not obtained, so that the AND-processing described above fails and finally, the advance of the movable electrode 2 is stopped.

Figure 7:
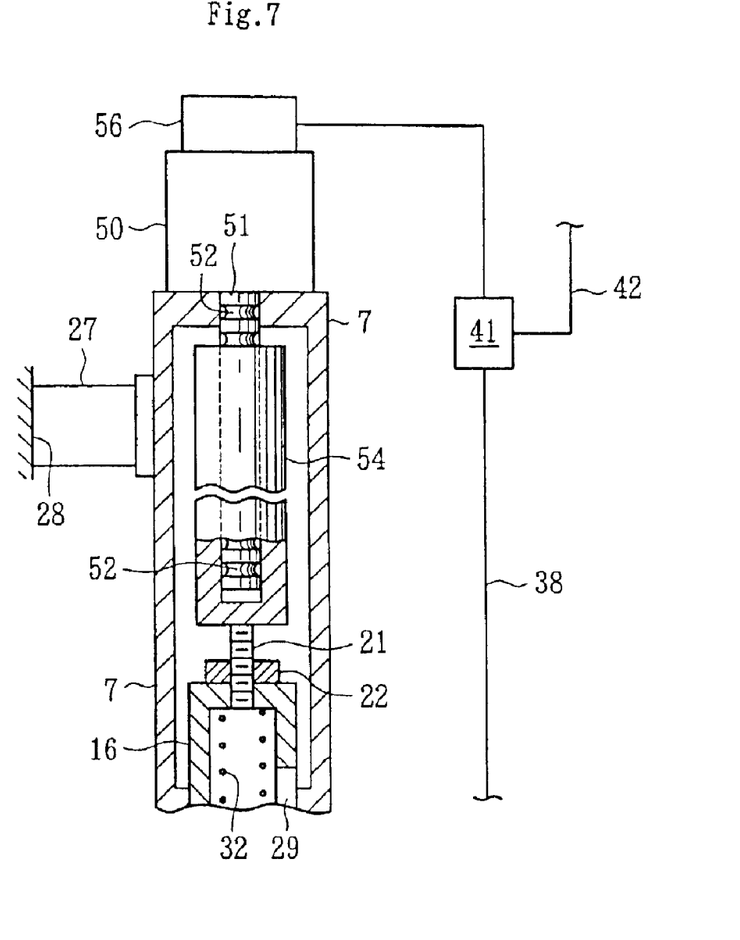
FIG. 7 is a local longitudinal section showing a modification of a feed rod drive means using a servomotor.
Figure 8:
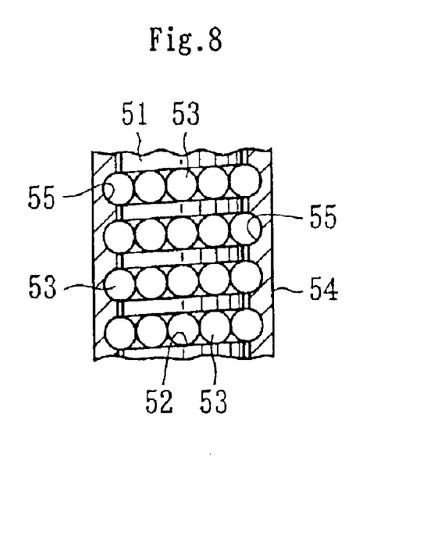
FIG. 8 is a sectional view of a ball screw portion in FIG. 7.

FIGS. 7 and 8 show a modification in which the air cylinder 19 described above is replaced by a servomotor 50 as a means for driving the feed rod. The servomotor 50 is joined to the guide tube 7, and has a mechanism joined to the output rotary shaft (not shown) thereof for converting rotary motion into advancing and retracting motion. As for such conversion mechanism, various types including a rack and pinion combination and a ball screw mechanism may be employed. Illustrated herein is a case of a ball screw mechanism. A screw shaft 51 is formed with a spiral groove 52, in which a number of steel balls 53 are received (see FIG. 8). The inner surface of a sleeve member 54 into which the screw shaft 51 is advanced is formed with a spiral groove 55 corresponding to the spiral groove 52, with steel balls 53 inserted in both spiral grooves 52 and 55. Therefore, when the screw shaft 51 is rotated, the sleeve member 54 is axially advanced and retracted. In addition, a rotation stop mechanism, not shown, is employed to prevent the sleeve member 54 from rotating concomitantly with the screw shaft 51. The sleeve member 54 is formed with said bolt portion 21, to which the rod portion 16 is joined. The rest of the arrangement is the same as in FIG. 1, and the same reference numerals are applied to the same elements as those shown in FIG. 1 and a detailed description thereof is omitted. Further, an encoder 56 is employed as a means for detecting the position of the feed rod, i.e., the rod portion 16. This encoder, which is adapted to operates as it receives rotation from the servomotor 50, is joined to the latter.

If the same type of operation as in FIG. 1 is employed, the operation is as follows. As soon as the starting signal is turned on, the servomotor 50 starts rotating, so that the rod portion 16 (the feed rod 6) is advanced along with the advance of the sleeve member 54. And if the guide rod 17 does not bump against the guide pin 1a or operator's finger, coincidence between the projection 30 and the sensor 34 takes place and the resulting signal from the line 38 is fed to the controller 41. Since the rpm of the servomotor 50 as when the feed rod 6 makes a full stroke normally has been grasped in advance by the encoder 56, the front end of the guide rod 17 stops accurately at a predetermined position when a predetermined rpm is reached. When such predetermined rpm is imputed into the controller 41, the signal from said coincidence between the projection 30 and the sensor 34 is processed in AND-conditions, and advance of the electrode 2 is effected from the controller 41 via the instruction line 42. If the operator's finger should be nipped, the guide rod 17 will retract into the rod portion 16, so that there is no possibility of coincidence between the projection 30 and the sensor 34 and hence a signal resulting from such coincidence is not fed into the controller 41. Therefore, since no processing in said AND-condition takes place, no signal is sent from the controller 41 to the instruction line 42 and no advance of the electrode 2 takes place. Thus, the possibility of the operator's finger being nipped in the electrode is eliminated.

The operation and the working-effect led from the definite construction of the embodiment described above are as follows.

The guide rod is inserted in the hollow slide rod 16 for advance and retraction movement, the projection 30 is fixed on the guide rod 17, and the sensor 34 detects the relative displacement of the guide rod 17, with the projection 30 used as a reference member. Therefore, the relative displacement of the guide rod 17 can be reliably detected at the projection 30.

The sensor 34 is fixed on the guide tube 7, which is a stationary member, and the projection 30 approaching the same is attached to the guide rod 17. Therefore, the movement of the projection 30 which is relatively displacing within the guide tube 7 can be accurately grasped and detected.

The projection 30 is received in the elongated opening 29 and urged against the end of the elongated opening 29 by the tension of the compression coil spring 32. Therefore, the feed rod 6, which is of double construction consisting of the slide rod 16 and guide rod 17, has its overall length set by the elastic force of the compression coil spring 32, the predetermined feed rod length is always accurately maintained provided that there is no trouble such as finger nipping, and the nut feed accuracy can be normally secured.

Figure 9:
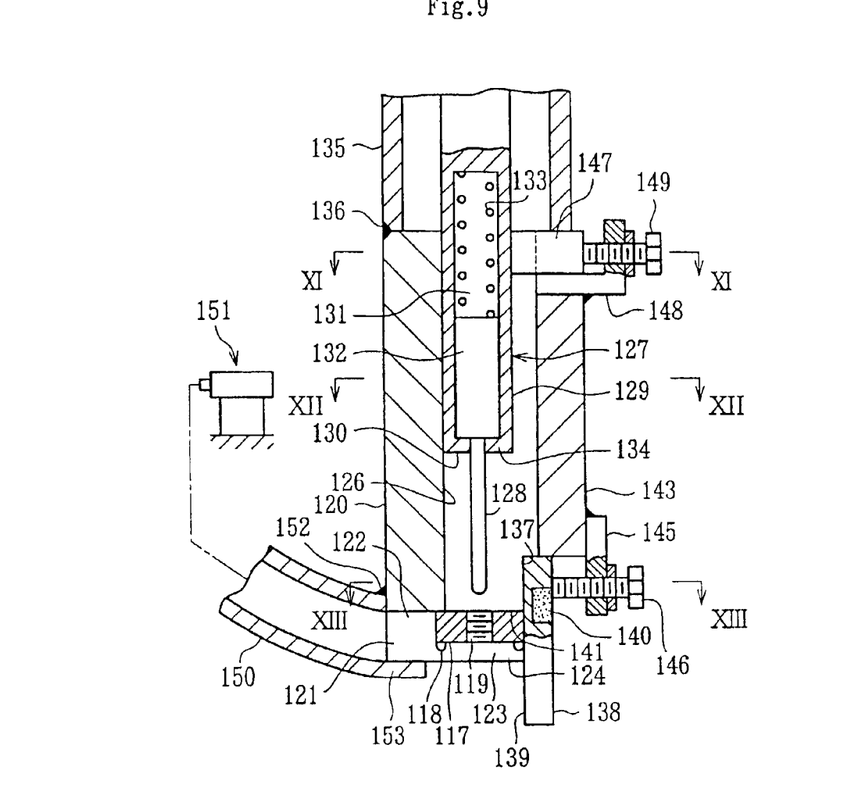
FIG. 9 is a longitudinal section showing another embodiment of the invention.
Figure 10:
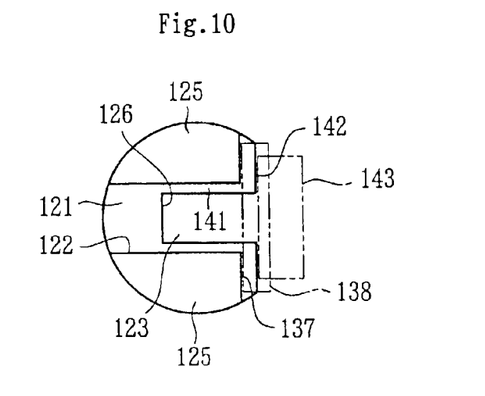
FIG. 10 is a bottom view of a guide tube unit in FIG. 9.

Next, before an embodiment shown in FIGS. 9 and 10 is described, a description will be given, for comparison purposes, of a construction shown in FIGS. 18 and 19 wherein a parts feed tube 101 of rectangular cross-section and a guide tube 102 of circular cross section are welded together at right angles and a provisional stop chamber 103 is formed at the intersection of the two. A guide plate 104 providing an inner wall for the provisional stop chamber 103 has a magnet 105 embedded therein. A projection nut 106 is attracted by the magnet 105 and temporarily locked (provisionally held) in the provisional stop chamber 103. The feed rod 107, which advances and retract within the guide tube 102, comprises a guide rod 109 which will extends through the threaded hole 108 in the projection nut 106, a slide rod 110 larger in diameter than the guide rod 109, and a push-out surface 111 formed in the boundary between the guide rod 109 and the slide rod 110. The parts feed tube 101 is formed with a notch 112 in order to form the provisional stop chamber 103, and is bifurcated at its end, each branch being formed with an end surface 113. The guide tube 102 is formed with a flat surface portion 114, and when the parts feed tube 101 and guide tube 102 are welded together, the end surfaces 113 and flat surface portion 114 define planes. The guide plate 104 is intimately contacted with this series of planes. A bolt 116 is screwed into a support piece 115 welded to the guide tube 102, and the fixing of the guide plate 104 is effected by the bolt 116.

Figure 18:
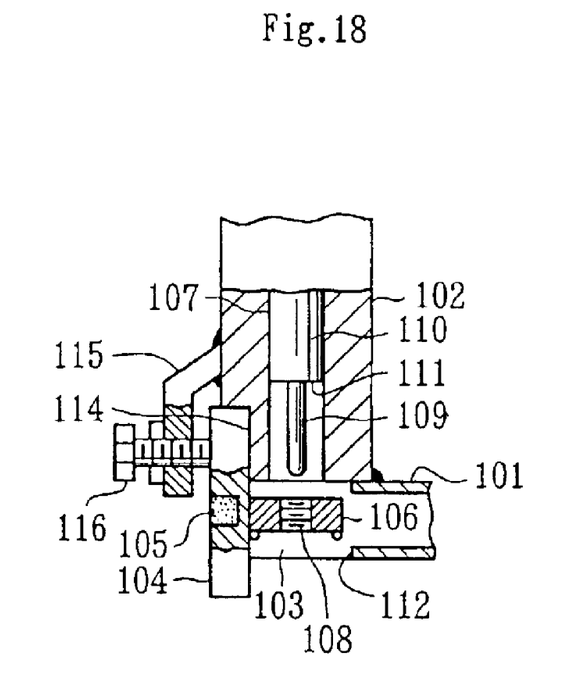
FIG. 18 is a longitudinal section showing the prior art.
Figure 19:
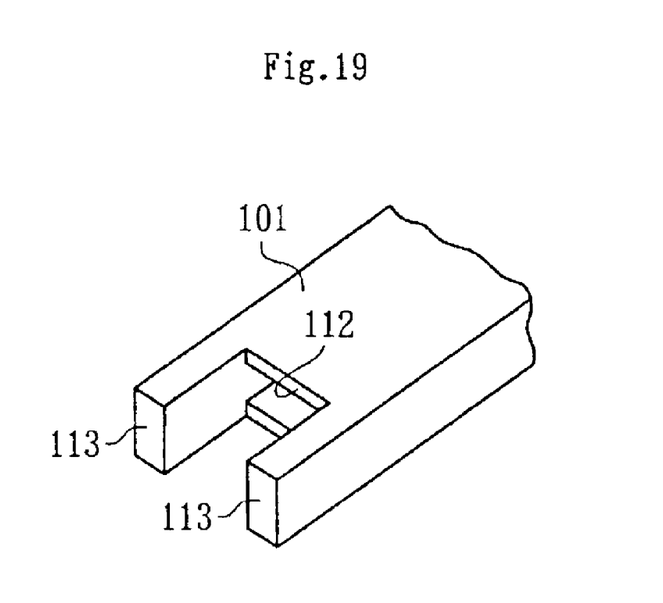
FIG. 19 is a perspective view of a parts feed tube in FIG. 18.

When the feed rod 107 advances from the state shown in FIG. 18, the guide rod 109 advances into the threaded hole 108. And, when the push-out surface 111 bumps against the end surface of the projection nut 106, the nut is moved against the attractive force of the magnet 105 and fed to an intended place. The intended place, not shown, is, for example, a guide pin (see FIGS. 1 and 2) projecting from the steel plate part on the fixed electrode. With the construction described above, manufacture takes a great deal of time since it is necessary to provide a notch in the front end of the parts feed tube. Particularly, since the space required for the provisional stop chamber has to be accurately found, the problem of manufacture becomes more difficult. If the relative positions of the guide tube and the parts feed tube, which are welded together, are not accurately set, it occurs that when the projection nut is temporarily locked (provisionally held) in the provisional stop chamber, the threaded hole is out of axial alignment with the guide rod now retracted. If such misalignment exists, the nut is flicked away by the guide rod, which is nonfulfillment of the role of normal feeding. Further, since the guide plate is intimately contacted with the end surfaces of the branches of bifurcation and with the flat surface portions of the guide tube, the formation of the flat surfaces for intimate contact have to be of high accuracy, which is disadvantageous from the standpoint of manufacture.

Figure 14:
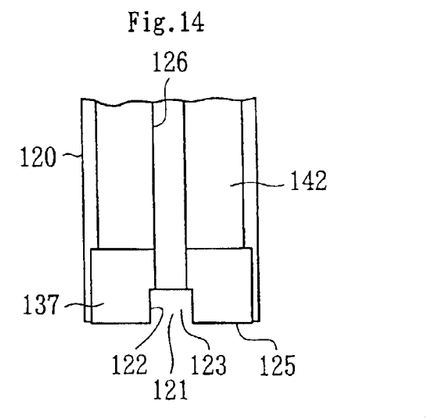
FIG. 14 is a side view of the guide tube unit in FIG. 9.

In contrast therewith, in an embodiment shown in FIGS. 9 and 10, a guide tube 120 is in the form of a thick-walled pipe member made of nonmagnetic material, for example stainless steel, with a groove 121 formed in the end surface thereof. This groove 121 is diametrically formed to pass through the center of the guide tube 120, thereby providing a guide section 122 and a provisional stop chamber 123. As can be understood from FIGS. 9 and 14, the groove 121 is opened downward in FIG. 9, and the lower side of the provisional stop chamber 123 presents an outlet opening 124. The reference numeral 125 in FIG. 10 denotes the end surface of the guide tube 120. In addition, FIG. 10 is a view, as seen from the bottom of FIG. 9, of the guide tube 120 with related members removed.

A guide groove 126 is formed along the axis of the guide tube 120. This guide groove 126 as is clear from FIG. 10, has a space of square section. The feed rod 127 comprises a guide rod 128 which will extends through the threaded hole 119 in the projection nut 117, a slide rod 129 larger in diameter than the guide rod 128, and a push-out surface 130 formed in the boundary between the guide rod and the slide rod. In this case, the construction is such that the guide rod 128 is adapted to advance into and retract from the slide rod 129. Therefore, the slide rod 129 is internally formed with a circular-section slide chamber 131, in which is inserted the slide portion 132, to which the guide rod 128 is joined. And, a compression coil spring 133 is installed in the slide chamber 131, with its tension urging the slide portion 132 against a stop portion 134, whereby the projecting length of the guide rod 128 is determined.

Figure 11:
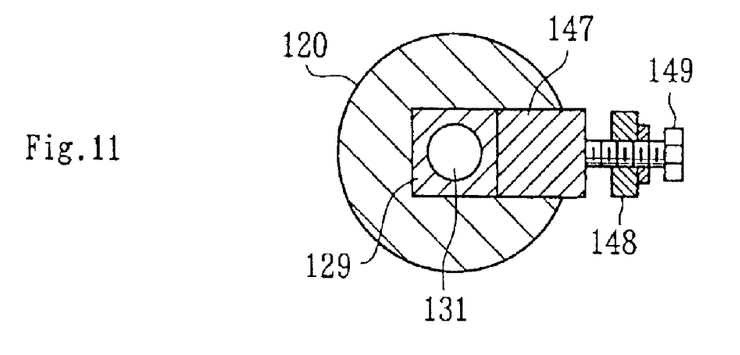
FIG. 11 is a XI—XI section of FIG. 9.

The slide rod 129 of the feed rod, as is clear from FIG. 11, is of square section. Accordingly, the push-out surface 130 is also square. The slide rod 129 is snugly fitted in the guide groove 126 and slidable along the guide groove. The guide tube 120 has a relay tube 135 welded thereto at 136, said relay tube 135 having an air cylinder (not shown) joined thereto. The piston rod of the air cylinder is joined to the slide rod 129, whereby the feed rod 127 is advanced and retracted. Using an air cylinder to advance and retract the feed rod in this manner has already become common practice.

The lower portion of the guide tube 120 is formed with a flat support surface 137. This surface is positioned perpendicular to the lengthwise direction of the groove 121. The support surface 137 has a guide plate 138 intimately contacted therewith, said guide surface 139 forming the inner surface of the provisional stop chamber 123. The guide plate 138 has a magnet (permanent magnet) 140 embedded therein. As shown, this is offset above the ceiling 141 of the provisional stop chamber 123, whereby the projection nut 117 attracted by the magnet 140 intimately contacts the ceiling 141; thus a provisional lock position which is always uniform is obtained. The reference numeral 118 denotes welding projections.

Figure 12:
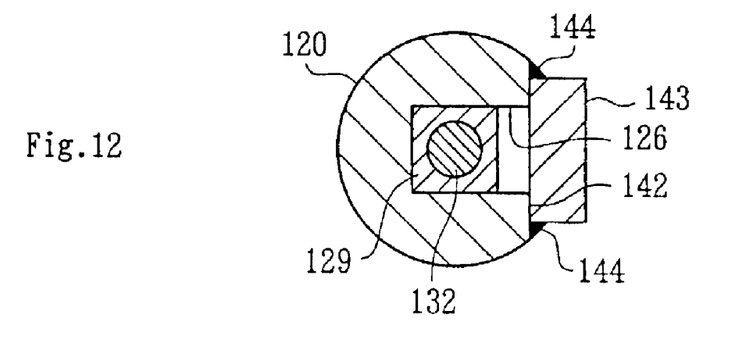
FIG. 12 is a XII—XII section of FIG. 9.
Figure 13:
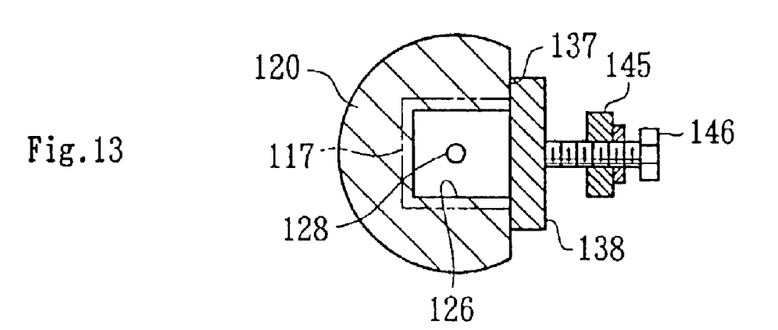
FIG. 13 is a XII—XII section of FIG. 9.

The guide tube 120 is formed with a receiving surface 142 (FIGS. 10 and 12) at a level one step above said support surface 137, and a cover plate 143 is intimately contacted therewith and welded to the guide tube 120. The weld is denoted by the reference numeral 144 in FIG. 12. A bolt 146 is screwed into a bracket 145 welded to this cover plate 143, fixing the guide plate 138 to the support surface 137 with the front end of said bolt (FIG. 13).

In order to prevent the advancing and retracting position of the slide rod 129 from deviating, that is, in order to prevent the slide rod 129 from displacing to the right-hand side of FIG. 9, the hold-down piece 147 is pressed against the slide rod 129. To this end, an L-shaped bracket 148 is welded to a cover plate 143 and a bolt 149 is screwed into the bracket, pressing the hold-down piece 147 against the slide rod 129 (FIG. 11).

A parts feed tube 150 of rectangular section extends from a parts feeder 151 and is welded to the guide tube 120 so that it is in communication with the groove 121. The reference numeral 152 denotes the weld. Part of the parts feed tube 150 is extended to provide a cover plate 153, covering the guide section 122. In addition, the guide plate 138 is also made of stainless steel, which is a nonmagnetic material. The place to which the projection nut 117 is to be fed is, for example, the steel sheet part on the fixed electrode, the threaded hole 119 being fitted on a guide pin projecting from said part; such part is a general place for feeding.

The operation of the embodiment described above will be described. FIG. 9 shows the projection nut 117 temporarily locked (provisionally held) in the provisional stop chamber 123, with the attraction of the magnet 140 acting on the nut 117. When the feed rod 127 is advanced, the guide rod 128 advances into the threaded hole 119 and then the push-out surface 130 abuts against the upper surface of the nut 117. Thereby, the nut 117 is pushed out to be fed to the intended place as it is sliding on the guide surface 139. If the operator's hand is nipped between the front end of the guide rod 128 and the steel sheet part, the slide rod 129 alone is advanced while the slide portion 132 is compressing the compression coil spring 133, so that the force acting on the hand is only the elastic force of the coil spring 133, minimizing damage to the operator.

Figure 15:
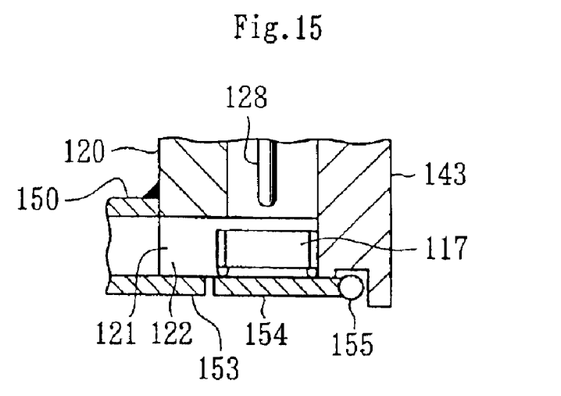
FIG. 15 is a fragmentary longitudinal section, similar to FIG. 9, showing a modification.

In a modification shown in FIG. 15, the way of provisionally holding the projection nut is changed, wherein an open/close plate 154 is employed. The cover plate 143 is extended downward, and attached to the front end thereof is the shaft 155 of the open/close plate 154. Though not shown, a helical spring is fitted to this shaft 155 to constantly impart a torque in the closing direction. As soon as the feed rod is advanced to push out the nut, the open/close plate 154 is forced to open, fulfilling the role of nut feeding.

Figure 16:
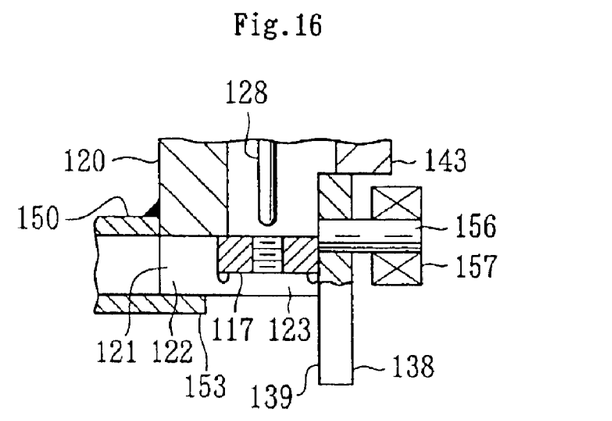
FIG. 16 is a fragmentary longitudinal section, similar to FIG. 9, showing a modification.
Figure 17:
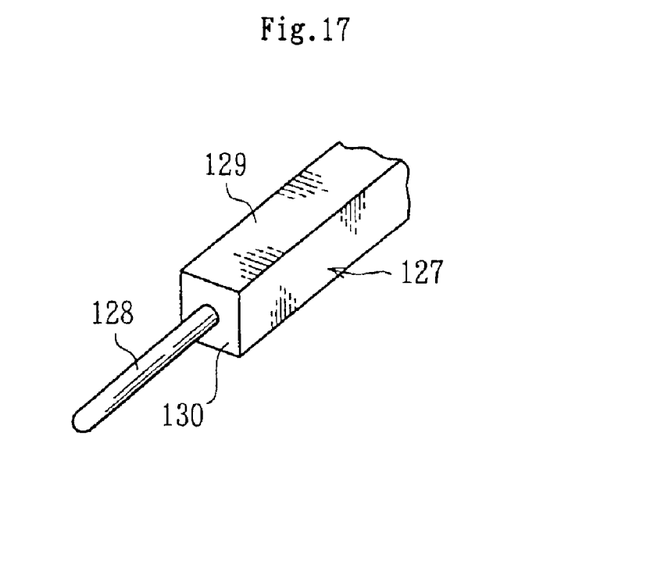
FIG. 17 is a perspective view of a feed rod.

In a modification shown in FIG. 16, the permanent magnet previously described is replaced by an electromagnet, wherein an iron core 156 is inserted in a guide plate 138 and an electromagnetic coil 157 is fitted to the iron core.

The relative positions of the groove 121 and the support surface 137 can be found with high accuracy in the machining stage. Therefore, the set position of the guide plate 138 can also be accurately determined, and the projection nut 117 in the provisional stop chamber 123 can always be locked in a given position. This means that accurate axial alignment between the guide rod 128 and the threaded hole 119 is reliably realized. Therefore, such malfunction as flicking away the nut can be avoided, and highly reliable nut feeding is possible. Further, since the guide tube is formed with the support surface 137 which is perpendicular to the lengthwise direction of the groove 121, the guide plate 138 is attached in the correct direction with respect to the space of the provisional stop chamber 123. Therefore, the square projection nut 117 is accurately provisionally locked without shifting in the direction of rotation with respect to the provisional stop chamber 123.

What is claimed is:

1. A method of automatically feeding parts having a through-hole, comprising the steps of:
    disposing a feed rod capable of advancing toward an intended place to which the part is to be fed, said feed rod consisting of a slide rod of larger diameter and a guide rod of smaller diameter, said guide rod retractably projecting beyond the front end of the slide rod;
    provisionally holding the part in a predetermined position on the advance/retraction axis of the feed rod;
    advancing the feed rod to cause the guide rod of the feed rod to pierce through the though-hole in the part so as to feed the part to said intended place; and
    detecting, when relative displacement of the guide rod with respect to the slide rod occurs during the advance of the feed rod, such relative displacement and issuing a signal.

2. A method as set forth in claim 1, wherein said part is a projection nut and said intended place is located between a pair of coaxially opposed welding electrodes.

3. A method as set forth in claim 1, wherein the advance of the welding electrode is stopped in response to said signal.

4. A device for automatically feeding parts having a through-hole, comprising:
    a feed rod capable of advancing toward an intended place to which a part is to be fed, said feed rod consisting of a slide rod of larger diameter and a guide rod of smaller diameter, said guide rod retractably projecting beyond the front end of the slide rod;

provisional holding means for provisionally holding the part in a predetermined position on an advance/retraction axis of the feed rod;

drive means for advancing the feed rod to cause the guide rod of the feed rod to pierce through the though-hole in the part so as to feed the part to said intended place; and detecting means for detecting, when relative displacement of the guide rod with respect to the slide rod occurs during the advance of the feed rod, such relative displacement and issuing a signal.

5. A device as set forth in claim 4, said part is a projection nut and said intended place is located between a pair of coaxially opposed welding electrodes.

6. A method as set forth in claim 5, wherein the advance of the welding electrode is stopped in response to said signal from said detecting means.

7. A device as set forth in claim 4, wherein said drive means is an air cylinder.

8. A device as set forth in claim 4, wherein said drive means comprises an electric motor, and a mechanism for converting the rotary motion of the electric motor into the axial motion of the feed rod.

9. A device as set forth in claim 4, wherein said detecting means is in the form of a first sensor attached to a stationary member for detecting the relative position of said guide rod with respect to said slide rod and issuing a signal.

10. A device as set forth in claim 5, further having a second sensor for detecting the return stroke of said feed rod and issuing a signal, wherein the advance of the welding electrode is allowed on the condition of presence of a signal from the first sensor and a signal from the second sensor.

11. A device as set forth in claim 4, including a guide tube receiving the feed rod for advance and retraction, and a parts feed tube joined to the front end of the guide tube, a groove formed in the end surface of said guide tube, said groove providing a guide section for guiding a part fed from said parts feed tube and a provisional stop chamber.

12. A device as set forth in claim 11, wherein a guide plate for forming the inner wall of the provisional stop chamber is installed at the end of said groove and a magnet is attached to said guide plate.

13. A device as set forth in claim 11, wherein the guide tube is made of nonmagnetic material.

14. A device as set forth in claim 11, wherein the slide rod of the feed rod is of square section and is slidably received in the guide groove of square section formed in the guide tube.

* * * * *